United States Patent [19]

Shelton

[11] Patent Number: 5,228,113
[45] Date of Patent: Jul. 13, 1993

[54] ACCELERATED TRAINING APPARATUS FOR BACK PROPAGATION NETWORKS

[75] Inventor: Robert O. Shelton, Houston, Tex.

[73] Assignee: The United States of America as represented by the Administrator of the National Aeronautics and Space Administration, Washington, D.C.

[21] Appl. No.: 716,182

[22] Filed: Jun. 17, 1991

[51] Int. Cl.$^5$ .............................................. G06F 15/18
[52] U.S. Cl. ........................................................ 395/23
[58] Field of Search .................................... 395/23, 21

[56] References Cited

U.S. PATENT DOCUMENTS 4,933,872  6/1990  Vanderberg et al. ................. 395/22
4,979,126  12/1990  Pao et al. ............................. 395/24

OTHER PUBLICATIONS

Rummelhart et al, "Learning Internal Representations by Error Propagation," Parallel Distributed Processing, vol. I, Foundations, Rummelhart and McClelland, eds, pp. 318-362 (1986).

Anton, Elementary Linear Algebra, Third Edition, 1981, pp. 4, 129, 186-187.

*Primary Examiner*—Allen R. MacDonald
*Attorney, Agent, or Firm*—Hardie R. Barr; Guy M. Miller; Edward K. Fein

[57] ABSTRACT

A supervised procedure for obtaining weight values for back-propagation neural networks is described. The method according to the invention performs a sequence of partial optimizations in order to determine values for the network connection weights. The partial optimization depends on a constrained representation of hidden weights derived from a singular value decomposition of the input space as well as an Iterative Least Squares optimization solution for the output weights.

10 Claims, 1 Drawing Sheet

FIG.1
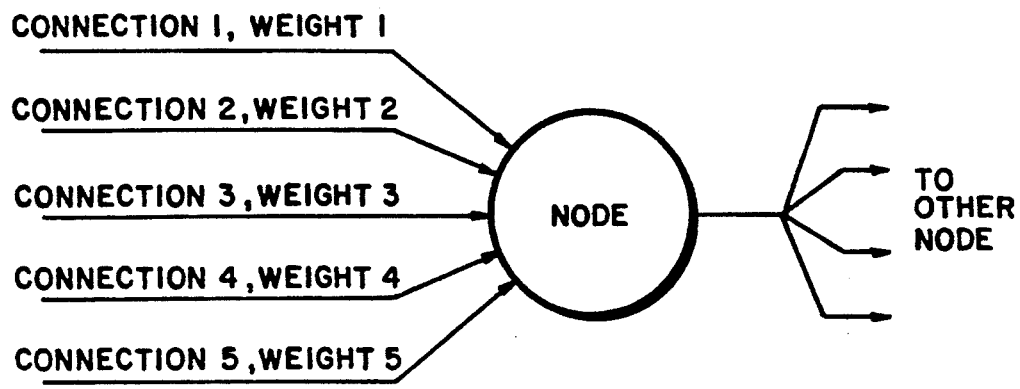
FIG.2
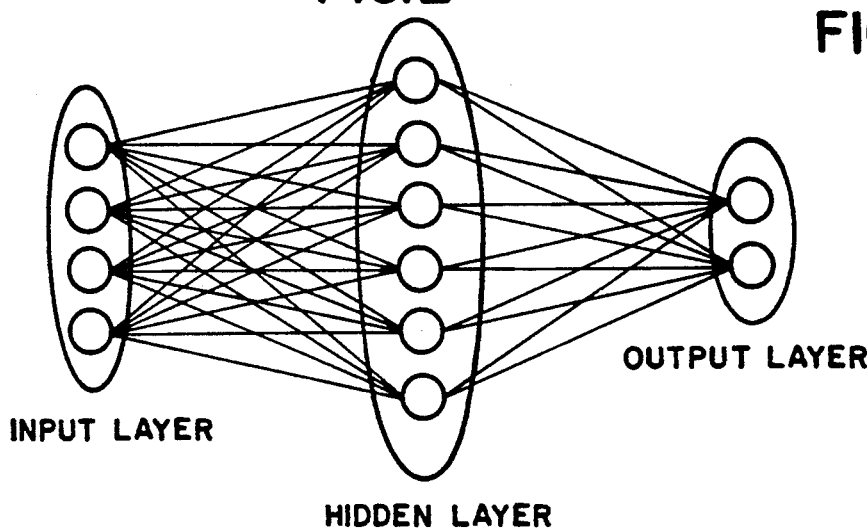
INPUT LAYER
HIDDEN LAYER
OUTPUT LAYER
FIG.3A
FIG.3B
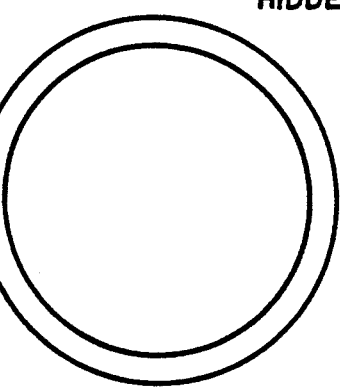
FIG.4A
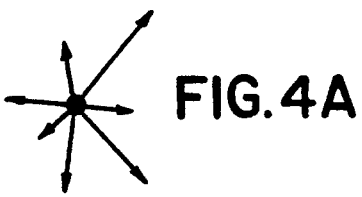
FIG.4B

ACCELERATED TRAINING APPARATUS FOR BACK PROPAGATION NETWORKS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The back propagation neural network, or "BPN", is an extremely useful neural network algorithm. The BPN "learns" a very general class of mappings which are usually represented as functions from $R^n$ to $R^m$. Theoretically a 3-layer BPN can learn almost any map, but in practice the application of the BPN has been limited due to the enormous amount of computer time required for the training process.

SUMMARY OF THE INVENTION

The principal object of the present invention is to provide a training procedure for a feed forward, back propagation neural network which greatly accelerates the training process.

Although the invention is, in principle, applicable to any neural network which implements supervised learning through error minimization or a so-called generalized delta rule, the neural network architecture for which the invention is best suited consists of a three-layer feed forward network having n1 inputs, n2 hidden units and n3 outputs. The invention contemplates that all learning will be supervised; i.e., correct outputs are known for all inputs in the training set.

Brief Description of the Method:

The training method according to the invention is applied to a feed-forward neural network having at least two layers of nodes, with a first layer having n1 nodes and a second layer having n2 nodes, each node of said second layer having a weight $W_{2i}$, where $i=1,\ldots,n2$. The method comprises the steps of:

(a) applying to the network a plurality p of input vectors for which the respective outputs are known, the input vectors forming an input matrix $$X = X_{i,j} \quad (1)$$

where $i=1,\ldots,p$ and $j=1,\ldots,n1$ (b) determining a set of n1 orthogonal singular vectors from the input matrix X such that the standard deviations of the projections of the input vectors along these singular vectors, as a set, are substantially maximized, the singular vectors each being represented as a column of the orthogonal matrix $$V = V_{i,j} \quad (2)$$

where $i, j=1,\ldots,n1$, where the condition of orthogonality is expressed by $$V_{1,i}V_{1,j} + V_{2,i}V_{2,j} + \ldots + V_{n1,i}V_{n1,j} = 1 \text{ if } i=j \text{ and } 0 \text{ otherwise}, \quad (3)$$

and there being associated with each singular vector an associated singular value which is a real number greater than or equal to zero, thereby to provide an optimal view of the input data;

(c) requiring that each weight $W_{2i}$ be adjusted in a direction colinear with a particular singular vector where said singular vector is selected periodically in such a way as to effect the greatest reduction in the deviations between network outputs and the desired training outputs and (d) Employing a direct solution method exemplified by, but not limited to, the Iterative Lease Squares (ILS) technique described subsequently to obtain any so-called "output weights" which in the instance of a 3-layer feed-forward network would be the weight matrix W3.

Explanation of the Method:

Let the inputs for the training set be represented as a matrix X which will be called the input matrix. The entries in X will be denoted $X_{i,j}$ where $i=1,\ldots,p$ and $j=1,\ldots,n1$ with p being the number of examples which comprise the training set. A set of orthogonal (perpendicular) axes (called optimal axes) is extracted from the data matrix X which provides the optimal view of the data. The optimal axes provide a view which is "optimal" in the sense that the standard deviations of the projections of input vectors along these axes as a set have maximal standard deviation; i.e., the optimal axes "spread out" the data to the largest possible degree. There is a well known mathematical procedure for computing the orthogonal unit vectors which define the direction of these axes in space. The unit vectors will be the right singular vectors of the data matrix X.

The equation describing the Singular Value Decomposition of the matrix X is $$X = UDV^t \quad (4)$$

where $U = u_{i,j}$, $i=1,\ldots,p$, $j=1,\ldots,n1$ is the matrix whose columns are generally known as the left singular vectors of X, D is a square diagonal matrix of size n1×n1 whose diagonal elements are generally known as the singular values of X, $V = V_{i,j}$ is the matrix whose columns are generally known as the right singular vectors of X, and the superscript t indicates the transpose of the matrix V. Moreover, the columns of the matrices U and V satisfy an orthogonality condition expressed by the equations:

$$\sum_{k=1}^{p} U_{k,i}U_{k,j} = 1 \text{ if } i=j \text{ and } 0 \text{ otherwise, and} \quad (5)$$

$$\sum_{k=1}^{n1} V_{k,i}V_{k,j} = 1 \text{ if } i=j \text{ and } 0 \text{ otherwise.} \quad (6)$$

Associated with the $i^{th}$ singular vector ($i^{th}$ column of V) is a singular value, a real number $\lambda_i$ which is greater than or equal to zero. The significance of each of the optimal axes is directly related to the magnitude of the corresponding singular value. Axes defined by singular vectors corresponding to larger singular values tend to "spread" the projections of the data in direct proportion to the magnitude of the singular value.

Depending on the problem, a number r of optimal axes will be used. According to a preferred embodiment of the invention the number r may be determined adaptively from the data, but it can easily be selected and supplied manually by an operator. Also in the operator-supplied category is the number of hidden nodes n2 which are to be used. With each hidden node, in a three-layer feed-forward neural network, there is an associated weight vector $w2_i$, where i is the subscript of the hidden node, $i=1,\ldots,n2$. In virtually all conventional networks the vector $w2_i$ can evolve in an arbitrary manner during the training process. The present invention allows each weight $w2_i$ to be adjusted only in a direction parallel to one of the optimal axes defined by the right singular vectors of X. Imposition of such a constraint dramatically decreases the number of optimization variables associated with the connections between the two layers. The conventional method requires optimization in a weight space of dimension n1Xn2 whereas the present invention reduces this number to n2, the number of hidden nodes. Accompanying this reduction in the dimensionality of the optimization is a corresponding reduction in the number of operations required for each training cycle.

Periodically it may be necessary to pick different singular vectors along which the hidden weights are to be adjusted. The singular vectors themselves only depend upon the input matrix X, therefore these vectors need be extracted only once. The process of selecting the optimal singular vectors to use at each hidden node requires a number of operations less than or equal to one conventional forward propagation cycle. Simulations have shown excellent results even when the initial choice of singular vectors is never disturbed. A key discovery is that the weight vectors for many problems may be determined very quickly with great accuracy by only allowing the input weights to change along 1-dimensional subspaces defined by the right singular vectors of the input matrix.

According to the present invention, therefore, instead of having to solve for all components of the hidden weight vectors, in the fast learning architecture of present invention, only the coefficients of the singular vectors (one such coefficient per node as opposed to hundreds or thousands per node in the conventional case) must be determined. The determination of these coefficients can occur in any one of several ways. The present preferred embodiment uses a gradient descent with a back-tracking line search.

In a feed-forward network with more than three layers it would be appropriate to treat nodes in all but the output layer as above; i.e., by imposing a constrained weight representation. Additional layers, however, would introduce additional processing overhead because the optimal view axes would have to be extracted after each change in the weights of previous layers. The method according to the invention works especially well for 3-layer networks because there are no weights preceding the input weights; therefore, once computed, the set of optimal view axes never change and, as will be detailed, it is easy to solve for output weights directly using the ILS technique.

Iterative Least Squares (ILS)

Our objective is to find the best output weight matrix $W_3$ for a given hidden weight matrix $W_2$. From the input matrix X and the hidden weight matrix we can obtain a matrix Z of hidden neuron outputs described by $$Z_i = \sigma_{n2}(W_2 X_i) \tag{7}$$

where $\sigma_n$ is the transfer function applied coordinate-wise i.e.

$$\sigma_n(<x_1,\ldots,x_n>) = <\sigma(x_1),\ldots,\sigma(x_n)> \text{ where } \sigma(x) \tag{8}$$

is any one-to-one differentiable function generally known as the transfer function of the network, such functions being exemplified by the so-called sigmoidal function defined by $$\sigma(x) = 1/(1+\exp(-x)) \tag{9}$$

and $i=1,\ldots,p$ and $Z_i$ is the $i^{th}$ row of the Z matrix. We then must minimize the sub-function $E_o$ defined by $$E_o(W_3) = \sum_{i=1}^{P} (\sigma_{n3}(W_3 Z_i) - \Omega_i)^2 \tag{10}$$

where $\Omega_i$ is the desired output corresponding to the $i^{th}$ input in the training set and the square of the vector quantity indicates the square of its magnitude.

Let Q be the matrix of actual outputs whose $i^{th}$ row $Q_i$ is given by the equation $$Q_i = \sigma_{n3}(W_3 Z_i) \tag{11}$$

Note that the $j^{th}$ element of $Q_i$, $q_{i,j}$, depends on $W_3$ in a limited way, i.e., $q_{i,j}$ only depends on the $j^{th}$ row of $W_3$. To reiterate, the $j^{th}$ column of Q is a function only of the $j^{th}$ row of $W_3$, therefore we can solve for the rows of $W_3$ separately with no fear that solving for row j will disturb the optimality of any of the other rows. Let $T_i$ be the $i^{th}$ row of $W_3$. Then the vector $T_i$ should minimize the expression $$E_{o,i} = (\sigma_p(ZT_i) - \Omega^i)^2 \tag{12}$$

where $\Omega^i$ denotes the $i^{th}$ column of the output matrix $\Omega$.

There are many available techniques for solving this equation for $T_i$ since the number of active optimization variables $n_2$ is relatively small. One possible approach would be to use the well known Pinrose pseudo-inverse $Z^+$ of the matrix Z defined by $$Z^+ = VD^{-1}U^t \tag{13}$$

where $Z = UDV^t$ is the singular value decomposition of Z and any terms involving reciprocals of zero singular values are dropped. This technique yields $$T_i = Z^+ \sigma_p^{-1}(\Omega^i) \tag{14}$$

where $\sigma_n^{-1}$ is the inverse of the one-to-one mapping $\sigma_n$ defined by $$Y = \sigma_n^{-1}(X_1,\ldots,X_n) = Y_1,\ldots,Y_n \tag{15}$$

and $$y_i = \sigma^{-1}(X_i) \tag{16}$$

The solution given by the equation for $T_i$ does not provide a true minimization of the function $E_{o,i}$ because the quantity which is really being minimized is the difference between $ZT_i$ and $\sigma_p^{-1}(\Omega^i)$ rather than the distance between $\sigma_p(ZT_i)$ and $\Omega^i$ in the least squares sense. The preceding fails to account for the fact that the function $\sigma_p$ may distort the sensitivity of a post-$\sigma$ error to a pre-$\sigma$ error, thus the above equation for $T_i$ might be trying for a close match of relatively insensitive coordinates which would force a mismatch in a more sensitive variable. The sensitivity problem might be overcome by including derivatives of $\sigma_p$ into the Z matrix. Specifically, a new matrix $Z'$ could be formed by multiplying $Z$ on the left by $\sigma_p'$ where $\sigma_p'$ is the Jacobian matrix of the mapping $\sigma_p$. This approach has two important disadvantages: First, there is no longer a single Z matrix to be used to obtain all $n_3$ rows of the $W_3$ matrix. This requires a singular value decomposition for $n_3$ different $Z'$ matrices. Perhaps an even more serious problem is to find reasonable values for $\sigma_p'$. In order to know $\sigma_p'(X)$, it is necessary to know X, but X is $ZT_i$ and $T_i$ is the weight vector for which a solution is sought. The traditional solution to this dilemma is to iterate.

Incremental Least Squares:

When linearization techniques are to be employed it is desirable, perhaps essential, to have a shrinking interval over which linearization is to occur. This requirement of a shrinking interval or increment over which to linearize the output transfer functions naturally gives rise to the concept of Incremental Least Squares (ILS). Suppose we are seeking a least squares solution to the equation $$G(X) = Y \qquad (17)$$

i.e., $(G(X)-y)^2$ is to be minimized, where X and Y are vectors. Let $G'(X)$ be the Jacobian matrix of G where the partial derivatives are evaluated at the point X. If an initial point $X_o$ is given, then we can linearize G about the point $X_o$ as follows $$G(X_o+\delta_o) \approx G(X_o) + G'(X_o)\delta_o \qquad (18)$$

The increment $\delta_o$ could be sought which moves G as close as possible to the desired value Y by assuming the linearization above and finding a least squares regression solution for $\delta_o$. Such a solution would be $$\delta_o = G'^+(X_o)(Y - G(X_o)) \qquad (19)$$

We could then construct a sequence $X_o, X_1, \ldots$ by $$X_n = X_{n-1} + \delta_{n-1} \qquad (20)$$

where $$\delta_{n-1} = G'^+(X_{n-1})(Y - G(X_{n-1})) \qquad (21)$$

A desirable property of such a sequence is that the increments $\delta_n$ are found which produce the minimum disturbance while moving toward the solution. We could apply this method directly to minimize the functions $E_{o,i}$, but it would be necessary to compute the matrix $G'^+(X_n)$ not only at each iteration step, but also, as observed previously, for each output node. If we further simplify the expression for $G'^+$ then only one pseudo-inverse calculation will be required. Let the function G be defined by $$G(X) = \sigma_p(ZX) \qquad (22)$$

As observed previously, $$G'(X) = \sigma_p'(ZX)Z \qquad (23)$$

If the diagonal Jacobian matrix $\sigma_p'$ is replaced by a diagonal matrix with entries bounding those of $\sigma_p'$ from above, then the resulting pseudo-inverse matrix provides a conservative update; i.e., the update tends to undershoot rather than overshoot the desired minimum. Specifically, from the above equation for $\sigma'(X)$, it follows that the diagonal elements of $\sigma_p'$ are never greater than $\frac{1}{4}$ when the customary sigmoidal non-linearty is used as the transfer function for the network. If a different transfer function is employed, then the constant $\frac{1}{4}$ would be replaced by an upper bound for the derivative of $\sigma$. Combining the preceding we obtain the following sequence $X_0, X_1, \ldots$ which approaches the optimal output weight vector $T_i$.

$$X_n = X_{n-1} + \delta_{n-1} \qquad (24)$$

where $$\delta_{n-1} = 4Z^+(\Omega^i - \sigma_p(ZX_{n-1})) \qquad (25)$$

This is termed a one-step method because the major overhead is the computation of the matrix $Z^+$ which must be done only once. Though the method ignores information which could be obtained from the transfer function derivatives, sensitivity information is included in the form of the errors which are passed back into the increment $\delta_n$. The update described by the above equation for $\delta_{n-1}$ is the Hessian update with the transfer function first derivatives replaced by $\frac{1}{4}$ (the upper bound) and transfer function second derivatives replaced by 0. The sweeping nature of the preceding simplifications makes further theoretical treatment of the sequence described by the equation for $\delta_{n-1}$ extremely complex. The method succeeds because most of the important Hessian information is carried in the Z matrix rather than in the diagonal Jacobian matrix of transfer function first derivatives and the tensor of second transfer function derivatives, most of whose elements are zero.

The training procedure according to the present invention can therefore be summarized as follows:

(1) Extract singular values and singular vectors from the input matrix X.

(2) Based on the magnitudes of the singular values, make a judgement of how many singular vectors must be retained.

(3) Decide how many hidden nodes to use. Note that the results of steps (1) and (2) will in general contribute to this determination, which may be essentially an educated guess.

(4) Set random values for the coefficients of the singular vectors which represent the input weights and the full matrix of output weights.

(5) Perform a numerical optimization to find the set of coefficients of the singular vectors which yields the best set of input weights for the current (initially random) output weights.

(6) Using the input weights derived from the coefficients of singular vectors obtained in step (5) use the ILS procedure to solve for the output weights.

(7) When no further decrease in network error can be obtained by applying steps (5) and (6), for each of the n2 hidden nodes, evaluate the learning potential $p_{i,j}$ of each of the r singular vectors. The learning potential $p_{i,j}$ of a singular vector is defined to be the absolute magnitude of the rate of change of the network error function with respect to changing weight $W2_i$ parallel to the $j^{th}$ singular vector, $i=1,\ldots,n2$, $j=1,\ldots,r$.

(8) Choose a new singular vector for each of the n2 hidden nodes according to which of the r singular vectors possesses the greatest learning potential for the particular hidden node, and initialize a new set of coefficients for the new singular vectors to be all 0.0's.

(9) Repeats steps (5), . . . ,(8) until the process stabilizes.

(10) Convert the coefficients and singular vectors which describe the input weights into the form of weights which are compatible with conventional network architectures. Said conversion is accomplished according to:

$$W2_{i,j} = \sum_k C_{i,k} V_{j,k} / \lambda_k \qquad (26)$$

where $C_{i,k}$ are the singular vector coefficients obtained in step (5), $V_{j,k}$ is the matrix V of right singular vectors of the input matrix X, $\lambda_k$ is the $k^{th}$ singular value of X and k is allowed to range over all indices from 1 to r for which the singular vector selection processes of steps (7) and (8) determined that singular vector k had maximal learning potential for node i. Although computed by the ILS procedure rather than numerical optimization as is the conventional method, the output weights produced by the accelerated training method are directly compatible with conventional network architectures.

Although the training procedure according to the invention is not exactly equivalent to conventional back propagation, the weights which are produced at the end of the procedure are entirely compatible with ordinary back propagation networks. Simulations have shown that, even in cases for which the subject invention fails to produce acceptable weights, these weights can be used as an excellent starting point for a conventional training method. Starting a conventional method with weights found by the accelerated method can reduce the number of cycles required for final convergence by a factor of 10 in many cases, and can even cause the conventional method to converge on problems for which convergence of the conventional methods was never observed when the conventional method was forced to work from a random start.

The training procedure according to the present invention is preferably employed under the following conditions:

(1) The neural network is a 3-layer feed-forward network; i.e., a network with one input layer, one hidden layer and one output layer.

(2) The sizes of the layers are such that a significant amount of computation occurs in the connections between the input layer and hidden layer.

Cost Comparisons:

The cost estimate $C_o$ for application of the standard gradient descent training method for C cycles through a data set of p examples may be calculated as follows:

$$C_o = Cpn2(n1+n3) \qquad (27)$$

The comparable cost $C_n$ for the training method according to the present invention is given by:

$$C_n = S + C(n2n3 + \xi n2(n1+n3)), \qquad (28)$$

where $\xi$ is the fraction of cycles which require an evaluation of the learning potential described in (7) and (8), and S is the cost of performing the singular value decomposition of the input matrix X. Note that the cost of the singular value decomposition is not multiplied by the number of cycles because it is only necessary to perform the singular value decomposition once at the outset of the training process. Moreover, the singular value decomposition need not be recomputed if outputs or network architecture are modified.

The preferred embodiments of the present invention will now be described with reference to the accompanying drawings.

BRIEF DESCRIPTION OF THE DRAWINGS

FIG. 1 is a representational diagram of a single artificial neuron or "node" whose output is a function of the input.

FIG. 2 is a representational diagram of a back propagation neural network having three layers: an input layer, a hidden layer and an output layer.

FIGS. 3a and 3b are perspective views of a hoop, viewed nearly edge on (FIG. 3a) and viewed from the side (FIG. 3b), which illustrate an optimal view, i.e., the effect of viewing an object from an optimal perspective.

FIGS. 4a and 4b show a representation of neural network weight vector being allowed to evolve in an unconstrained manner (FIG. 4a) and being constrained to evolve along a preferred optimal axis only (FIG. 4b).

DESCRIPTION OF THE PREFERRED EMBODIMENTS

The preferred embodiments of the present invention will now be described with reference to FIGS. 1-4 of the drawings.

Feed forward, back propagation neural networks are well known in the art. Such networks comprise a plurality of artificial "neurons" or "nodes" connected in a highly parallel manner. The key to the functioning of such a "BPN" is the set of weights associated with each node, which vary to determine the level of association between nodes. It is these weights that represent the information stored in the system.

A typical artificial neuron is shown in FIG. 1. The neuron may have multiple inputs, but only one output. The input signals to the neuron are multiplied by the weights and summed to yield total neuron input I. For the $i^{th}$ neuron shown in FIG. 1, the neuron input I and output O are given by:

$$I_i = \text{Neuron input} = \sigma_j W_{i,j} I_j \qquad (29)$$

$$O_i = \text{Neuron Output} = 1/(1+e^{-I_i}) \qquad (30)$$

where j identifies the source of the signal $I_j$ to the weight $W_{i,j}$. The neuron output may be a so-called "sigmoid" function of the input:

$$1/(1+e^{-x}).$$

The sigmoid is, in some respects, representative of real neurons, which approach limits for very small and very large inputs. Each neuron may have an associated "threshold" e which is subtracted from the total input I so that $x = I_i - e$. It is customary in the art to treat these thresholds as weights leading from an input fixed at unity to the threshold neuron. This treatment of thresholds allows the method according to the subject invention to be directly applicable to neural networks with or without thresholds.

There are several known neural net learning algorithms, such as back propagation and counter propagation, which are used to train networks. The programmer "trains" the net by supplying the input and corresponding output data to the network. The network learns by automatically adjusting the weights that connect the neurons. The weights and the threshold values of neurons determine the propagation of data through the net and its response to the input.

FIG. 2 shows a back propagation network comprising an input layer having four nodes (n1=4), a hidden layer having six nodes (n2=6) and an output layer having two nodes (n3=2). From the number of connections in this simple network, it will be appreciated that training the net to the correct responses is normally a computationally expensive process. The purpose of the present invention is to reduce this computation time and expense.

Theoretical Basis of the Invention:

The invention operates by performing a sequence of partial optimizations in weight space which are of two types. Each type of partial optimization may be viewed as a partitioning of the network weights into two or more classes, performing optimization on one class at a time, and proceeding from class to class according to an iteration strategy. The simpler partial optimization considers the connections between the hidden and output layers separately from those from the input to the hidden layer. The output connections can be found by the ILS procedure because these connections have known outputs and inputs which are also known if the hidden weights are assumed, i.e., excluded from the partial optimization.

The other kind of partial optimization involves decomposing the input weight space in a manner which provides the optimal view of the input data. This decomposition also determines a partial optimization strategy during which the hidden weights are constrained to change along one-dimensional subspaces as shown in FIG. 4b. This constraint limits the active optimization variables during each step to a single coefficient for each hidden node.

The optimal axes for the hidden weight space decomposition are the right singular vectors of the input matrix X. To illustrate this concept of optimality FIGS. 3a and 3b show two views of a two-dimensional hoop imbedded in a space of three or more dimensions. If the rows of the input matrix X were to contain random samples from the hoop, then the first two right singular vectors of X (the two corresponding to the largest singular values) would be oriented in the plane of the hoop. If the row vectors of X were then projected along the axes defined by the first two singular vectors of X, and the projections were plotted in two-dimensional space, then the result would be the hoop laid flat and thus most visible in the two-dimensional plane.

Advantages Over The Standard Method:

The major advantage of the training procedure according to the present invention is reduced training cost. Note that the training costs given above suggest that the accelerated training method will never be more costly than the conventional method provided that $$\xi < (n1-1)/n1.$$

Clearly lessor values of the parameter $\xi$ or greater values of the parameter n1 indicate circumstances in which the method according to subject invention should be considered.

Illustration of the Invention:

The nature and operation of the present invention is illustrated in FIGS. 3 and 4. FIGS. 3a and 3b show two views of a circular hoop in space. FIG. 3a presents the hoop nearly edge-on whereas FIG. 3b, which is the optimal view, displays the hoop as a circle, thus providing much more information about this device.

With the present invention, the axes defined by the singular vectors corresponding to the larger singular values tend to "spread" the projections of the data so that the true nature of the data becomes apparent. The singular vectors extracted from the inputs are thus used to quickly find the optimal projections or views of the data.

FIG. 4a shows standard weight vectors which can evolve in an arbitrary direction. According to the invention, the hidden weight vectors are constrained to evolve through linear subspaces (FIG. 4b) which greatly reduces the amount of computation since, instead of having to solve for all components of the hidden weight vectors, only the coefficients of the singular vectors (one such coefficient per node as opposed to hundreds or thousands per node in the conventional case) must be determined.

Software Implementation: A software implementation of the present invention is set forth in the attached Appendix.

Software Description: The program is written in the C computer language and is intended to be ported to IBM compatible personal computers with TURBO C, Berkeley UNIX work-stations as well as most computer systems with C language compilers.

To Compile:

TURBO C:

Edit the file "flub.h", and if necessary, change the definition of "TBC" to read "#define TBC 1"

At the system command prompt type the instruction "tcc -mh flub.c sing_val.c"

This instruction will cause the creation of the three files "flub.obj", "sing_val.obj" and "flub.exe". To run the program type "flub" at the system command prompt.

Berkeley UNIX Work-stations:

Edit the file "flub.h" and if necessary change the definition of "TBC" to read "#define TBC 0"

At the command line prompt type the instruction "cc -g flub.c sing_val.c -lm -o flub"

This command will create the three files "flub.o", "sing_val.o" and "flub". To run the program type "flub" at the command prompt.

Running the Program:

The program only requires a file containing the input/output pairs (i/o pairs) which will be used to train the network. This file should contain decimal numbers in ASCII text in the form required by the Network Execution and Training Simulator (NETS), a product of the National Aeronautics and Space Administration (NASA), and available from COSMIC, 382 East Broad Street, Athens, Ga. 30602. The name of this file should have the extension ".iop". A second optional file, "describe.net" may be used to facilitate execution of the program. If present, this file should contain three lines with the following information.

L1: Seed for pseudo random number generation (if blank program will use system clock for this purpose)

L2: Numbers of (a) inputs, (b) outputs, (c) hidden nodes, and (d) singular vectors to use. The program will prompt for (c) and (d) if not present in the file. Items (a) and (b) are mandatory.

L3: The name of the ".iop" file written without the ".iop" extension, e.g. to use the file "pattern.iop" this line should read "pattern".

The program will prompt for this input if not present in the file.

At start-up the user is given the option of loading I/O from a binary work-file. This will generally be much quicker than loading the training set from an ASCII file. The work-file is automatically created when the ASCII file is processed so that you need only read the ASCII file once, thereafter use the work-file.

The user communicates with the program through a simple command line interface. Each command is given by typing a letter followed by a carriage return. All but two of the commands are self-explanatory. These two commands for training and 'd' for choosing the "descent mode".

Training:

When you select the 't' option you are executing the steps of the Accelerated Training Method. This action requires two inputs from the user, counts of "major" and "minor" cycles. Major cycles are defined to be those in which the learning potential is evaluated, and thus are much more costly than minor cycles. The number of minor cycles will be interpreted as the number of partial optimization steps between major cycles. The ILS solution for the output weights is done once in every major cycle. The number $\xi$ which governs the relative cost of the Accelerated method in comparison to the conventional method is simply the ratio of major cycles to minor cycles.

$\xi$ = (major cycle count)/(minor cycle count)

Descent Selection:

This software implementation of the Accelerated Training Method offers two numerical methods for determination of optimal coefficients for the singular vectors which determine the hidden weights. The gradient method uses straight gradient descent with backtracking line search. The direct method uses a linearized Hessian method in which the sigmoids are replaced by locally linear mappings. The direct method is more costly, but will require fewer minor cycles to produce optimal coefficients. The cost of the direct method increases rapidly with n2, the number of hidden nodes, and thus the gradient method is usually preferable for large networks.

NETS Compatibility:

As noted, the i/o files for this program are compatible with those for NETS. If the weights generated by this program are to be used by NETS, then the following rules must be followed.

(1) The number of nodes in layer 0 (NETS' input layer) must be equal to n1 (item (a) in line 2 of "describe.net").

(2) The number of nodes in layer 1 (NETS' output layer) must be equal to n3 (item (b) of line 2 in "describe.net").

(3) The number of nodes in layer 2 (a hidden layer for NETS) must be equal to n2 (item (c) on line 2 of "describe.net").

(4) The network implemented by NETS must be fully connected.

(5) The network implemented by NETS must have 3 layers.

The name of the weight file created by this program automatically has the ".pwt" extension, and as such, is compatible with the 'p' (portable) format for NETS weight files. The weights determined by this program are generated for a network with no thresholds (biases) but are stored in a fashion which renders them compatible with networks with or without thresholds. Even for networks with no biases, NETS requires bias values to be included in weight files. The program includes bias values in its weight files as 0.0's.

There has thus been shown and described a novel training method for feed-forward, back propagation neural networks which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

```
d = u - 2.0*v + w;
if (d > 0.0)
return (0.5*h*(w-4.0*v+3.0*u)/d);
else
if (u < w)
return 0.0;
else
return 2.0*h;
} /* end best_r */ void update (r)
float r;
{
int i;

if (!stop_flag)
for (i = 0; i < size_hidden; i++)
hidden_weight_coefficient[i]-=(r*delta_c[i]);
} /* end update */ void restore (r)
float r;
{
int i;
```

```c
if (!stop_flag)
for (i = 0; i < size_hidden; i++)
hidden_weight_coefficient[i]+=(r*delta_c[i]);
} /* end restore */ void compute_output_weights ()
{
int i, j, k, n, rnk;
float s, t0, t1;
static float *y = NULL, *z, *temp_1, *temp_2;

if (y == NULL)
{
y = (float*)mem_alloc(num_pairs*sizeof(float));
z = (float*)mem_alloc(num_pairs*sizeof(float));
temp_1 = (float*)mem_alloc(size_hidden*sizeof(float));
temp_2 = (float*)mem_alloc(size_hidden*sizeof(float));
} /* end if */
for (i = 0; i < size_hidden; i++)
for (j = 0; j <= i; j++)
{
vip[i][j] = 0.0;
for (n = 0; n < num_pairs; n++)
vip[i][j]+=(hidden_output[n][i]*hidden_output[n][j]);
vip[j][i] = vip[i][j];
} /* end for j */
sing_val (size_hidden, size_hidden, vip, value, evip);
for (rnk = 0; (rnk<size_hidden)&&(value[rnk]>machine_zero); rnk++);
for (k = 0; k < size_output; k++)
{
for (;;)
{
t0 = 0.0;
prop_vector (size_hidden, num_pairs, weight_1[k], hidden_output, y);
for (n = 0; n < num_pairs; n++)
{
y[n] = 4.0*(outpt[n][k]-sigmoid(y[n]));
t0+=square(y[n]);
} /* end for n */
t0/=16.0;
prop_transpose (size_hidden, num_pairs, y, hidden_output, temp_1);
prop_transpose (size_hidden, size_hidden, temp_1, vip, temp_2);
for (i = 0; i < rnk; i++)
temp_2[i]/=value[i];
prop_vector(rnk, size_hidden, temp_2, evip, temp_1);
for (i = 0; i < size_hidden; i++)
weight_1[k][i] += temp_1[i];
t1 = 0.0;
prop_vector (size_hidden, num_pairs, weight_1[k],hidden_output, y);
for (n = 0; n < num_pairs; n++)
{
s = sigmoid(y[n])-outpt[n][k];
t1+=square(s);
} /* end for n */
if (t1<(num_pairs*.0000001))
break;
if (t1 > (t0*0.98))
{
for (i = 0; i < size_hidden; i++)
weight_1[k][i] -= temp_1[i];
break;
} /* end if */
} /* end for ;; */
} /* end for k */
} /* end compute_output_weights */ void direct_hidden()
{
int i, j0, j1, n;
float d, t;
static float *temp=NULL;
```

```
if (temp == NULL)
temp = (float*)mem_alloc(size_hidden*sizeof(float));
for (j0 = 0; j0 < size_hidden; j0++)
for (j1 = 0; j1 <= j0; j1++)
{
vip[j0][j1] = 0.0;
for (n = 0; n < num_pairs; n++)
{
t = d_sigmoid(hidden_activation[n][j0],hidden_output[n][j0])*
d_sigmoid(hidden_activation[n][j1], hidden_output[n][j1])*inpt[n][j0]*inpt[n][j1];
for (i = 0; i < size_output; i++)
{
d = d_sigmoid(output_activation[n][i], net_out[n][i]);
vip[j0][j1]+=(t*weight_1[i][j0]*weight_1[i][j1]*square(d));
} /* end for i */
} /* end for n */
vip[j1][j0] = vip[j0][j1];
} /* end for j1 */
gradient ();
sing_val (size_hidden, size_hidden, vip, value, evip);
for (i = 0; (i<size_hidden)&&(value[i]>machine_zero); i++);
prop_transpose (size_hidden, size_hidden, delta_c, vip, temp);
for (j0 = 0; j0 < i; j0++)
temp[j0]/=value[j0];
prop_vector (i, size_hidden, temp, evip, delta_c);
} /* end direct_hidden */ void learn (c)
int c;
{
int i, n;
float e0, e1, e2, r1;

propagate ();
for (i = 0; (i<c)&&!stop_flag&&(alpha>machine_zero); i++)
{
e0 = rms();
(*descent_method)();
update (alpha);
propagate ();
e1 = rms ();
update (alpha);
propagate ();
e2 = rms ();
restore (2.0*alpha);
while (!stop_flag&&(e1<e0)&&(e2<e1))
{
e1 = e2;
alpha*=2.0;
update (2.0*alpha);
propagate ();
e2 = rms();
restore (2.0*alpha);
} /* end while */
while (!stop_flag&&(e1 > e0)&&(alpha > machine_zero))
{
e2 = e1;
alpha*=0.5;
update (alpha);
propagate ();
e1 = rms();
restore (alpha);
} /* end while */
r1 = best_r (alpha, e0, e1, e2);
update (r1);
propagate();
alpha = r1;
} /* end for i */
if (i<c)
printf(" %d passes\n", i);
compute_output_weights();
add_sv();
```

```
for (n = 0; n < num_pairs; n++)
for (i = 0; i < size_hidden; i++)
old_hidden_activation[n][i] = hidden_activation[n][i];
set_key (rank);
alpha = 1.0;
} /* end learn */ void cycle (major, minor)
int major, minor;
{
int i;
float local_time;

local_time = clock()/CLK_TCK;
for (i = 0; (i<major)&&!stop_flag; i++)
{
learn (minor);
propagate ();
printf (" rms error = %f\n maximum error = %f\n",
rms(), max_error ());
} /* end for i */
local_time = clock()/CLK_TCK-local_time;
total_time+=local_time;
total_cycles+=i;
} /* end cycle */ void save_weights ()
{
int i, j;
float t;
FILE *weight_file;
coefficient_type *p;

printf (" save weights to file <%s> ", filename);
if (strlen(gets(str1)))
strcpy (filename, str1);
while ((weight_file=fopen(strcat(filename, ".pwt"), "w"))==NULL)
{
printf ("file %s didn't open for output\n file name> ", filename);
gets(filename);
} /* end while */
filename[strlen(filename)-4] = '\0';
for (i = 0; i < size_hidden; i++)
for (j = 0; j < size_input; j++)
{
t = 0.0;
for (p = weight_matrix[i]; p != NULL; p = p->next)
t+=(p->coeff*singular_vector[j][p->svdnum]/singular_value[p->svdnum]);
fprintf (weight_file, " %f\n", t);
} /* end for j */
for (i = 0; i < size_output; i++)
for (j = 0; j < size_hidden; j++)
fprintf (weight_file, " %f\n", weight_1[i][j]);
for (i = 0; i < size_input+size_hidden; i++)
fprintf (weight_file, " %f\n", 0.0);
fclose (weight_file);
} /* end save_weights */ void teach()
{
int major=1, minor=5;

printf (" press 'q' to quit\n");
for (;;)
{
stop_flag = false;
printf (" enter counts for major and minor cycles <%d %d> ", major, minor);
sscanf (gets(str1),"%d%d",&major, &minor);
if (str1[0]=='q')
break;
cycle (major, minor);
} /* end for ;; */
} /* end teach */
```

```c
void display_time_and_cycles ()
{
printf (" %ld cycles in %8.2f seconds\n", total_cycles, total_time);
} /* end display_time_and_cycles */ void break_handle()
{
signal (SIGINT, break_handle);
stop_flag = true;
} /* end break_handle */ void change_descent_function ()
{
if (descent_method == gradient)
{
printf (" Now using direct approximation\n");
descent_method = direct_hidden;
} /* end if */
else
{
printf (" Now using gradient method\n");
descent_method = gradient;
} /* end else */
} /* end change_descent_method */ void menu ()
{
printf (" c      display total cycles and training time\n");
printf (" d      change descent method\n");
printf (" s      Save weights\n");
printf (" t      Train network\n");
printf (" h      print this menu\n");
printf (" q      quit program\n");
} /* end menu */ main ()
{ signal (SIGINT, break_handle);
descent_method = gradient;
allocate_net();
printf (" press 'h' for help\n");
for (str1[0]='\0';;)
{
printf (" command> ");
if (gets(str1)[0]=='q')
break;
switch (str1[0])
{
case ('t'):
{
teach ();
break;
} /* end 't' */
case ('c'):
{
display_time_and_cycles();
break;
} /* end 'c' */
case ('d'):
{
change_descent_function ();
break;
} /* end 'd' */
case ('s'):
{save_weights();
break;
} /* end 's' */
case ('h'):
{
menu ();
break;
```

```c
} /* end 'h' */
default:
break;
} /* end switch */
} /* end for ;; */
fclose (description_file);
} /* end main */
/* File:   flub.h-- a header file for the */
/* Fast Learning Utility for Backpropagation. */
/* by Dr. Robert O. Shelton */
/* A product of the Software Technology Branch, NASA/JSC */
/* History:  The concepts leading to the development of this program were */
/* formulated by the author during the months of July and August 1990.
The bulk of this code was written in the interval September 1-8 1990 */
/* Testing and further refinements were carried out from September 8 to */
/* September 18 1990 */
/* Learning-potential-based vector switching added September 19-24 */
/* Direct solution for hidden weight coefficients added */
/* September 25 - October 1 1990 */
/* Testing and minor revisions October 2 - October 19 1990 */ include <stdio.h>
include <string.h>
#include <math.h>
#include <signal.h>
#include <time.h>
#define TBC 0
#if TBC
#include <alloc.h>
#define r_b 15
#define GIGANTIC huge
#else
#include <malloc.h>
#define r_b 15
#define GIGANTIC
#endif
#ifndef CLK_TCK
#define CLK_TCK 1000000.0
#endif
#define true '\01'
#define false '\0'
#define infinity 1000000.0
#define machine_zero 0.00001
#define check_break() (printf(" \b"))
#define   clip(l,h,x)  (((x)<(l))?(l):((x)>(h))?(h):(x))
#define min(a,b)  (((a)<(b))? (a): (b)) .
#define square(x)  ((x)*(x))
#define sigmoid(x)  (1.0/(1.0+exp(-(x))))
#define d_sigmoid(x,y)  ((y)*(1.0-(y)))
#define frand(x,y)  ((x)+((y)-(x))*((rand()&((1l<<r_b)-1))/\
(float)(1l<<r_b)))

typedef char string [256];

typedef struct c_t
{
int svdnum;
float coeff;
struct c_t *next;
} /* end struct */
coefficient_type;

EXTERN int num_pairs, size_input, size_hidden=0, size_output,
rand_seed=0, rank=0, *key, stop_flag;
EXTERN long total_cycles=0l;
EXTERN float alpha, total_time=0.0;
EXTERN float rand_lim_0, rand_lim_1;
EXTERN float **err_vector, *hidden_weight_coefficient, *delta_c, **hidden_err,
GIGANTIC**inpt, GIGANTIC**outpt, **net_out, **hidden_output,
**hidden_activation, **old_hidden_activation, **output_activation;
EXTERN float GIGANTIC*io_base, *singular_value, **singular_vector,
**vip, *value, **evip, **weight_1, **delta_w_1;
EXTERN FILE *description_file;
```

```
EXTERN string filename, str1;
EXTERN coefficient_type **weight_matrix;
EXTERN void (*descent_method)();

FILE *in_file();
FILE *out_file();
char *mem_alloc();
char GIGANTIC*long_mem_alloc();
float dot();
float learning_potential();
float diagonal_gradient_norm();
float max_error();
float rms();
float best_r();
int get_svd();
void bubble();
void compute_svd();
void sing_val();
void print_learning_stats();
void set_key();
void add_sv();
void get_iop();
void save_svd();
void prop_vector();
void prop_transpose();
void allocate_hidden();
void allocate_net();
void propagate();
void gradient();
void update();
void restore();
void compute_output_weights();
void direct_hidden();
void learn();
void cycle();
void save_weights();
void teach();
void display_time_and_cycles();
void break_handle();
void change_descent_function();
void menu();

/* File:  sing_val.c-- Auxiliary numerical support routines for FLUB */
/* by Dr. Robert O. Shelton */
/* A product of the Software Technology Branch, NASA/JSC */ include <stdio.h>
include <math.h> extern char *mem_alloc();

static float at,bt,ct;
#define PYTHAG(a,b) ((at=fabs(a)) > (bt=fabs(b)) ? \
(ct=bt/at,at*sqrt(1.0+ct*ct)) : (bt ? (ct=at/bt,bt*sqrt(1.0+ct*ct)): 0.0))

static float maxarg1,maxarg2;
#define MAX(a,b) (maxarg1=(a),maxarg2=(b),(maxarg1) > (maxarg2) ?\
        (maxarg1) : (maxarg2))
#define SIGN(a,b) ((b) >= 0.0 ? fabs(a) : -fabs(a))

void bubble (m, n, a, w, v)
int m, n;
float **a, *w, **v;
{
int i, j, k;
float t;

for (i = 1; i < n; i++)
for (j = (n-1); j >= i; j--)
if (fabs(w[j]) < fabs(w[j+1]))
{
t = w[j];
w[j] = w[j+1];
w[j+1] = t;
```

```c
        for (k = 1; k <= n; k++)
        {
        t = v[k][j];
        v[k][j] = v[k][j+1];
        v[k][j+1] = t;
        } /* end for k */
        for (k = 1; k <= m; k++)
        {
        t = a[k][j];
        a[k][j] = a[k][j+1];
        a[k][j+1] = t;
        } /* end for k */
        } /* end if */
        } /* end bubble */ void compute_svd(m,n,a,w,v)
float **a,*w,**v;
int m,n;
{
        int flag,i,its,j,jj,k,l,nm;
        float c,f,h,s,x,y,z;
        float anorm=0.0,g=0.0,scale=0.0;
        float *rv1;

/*
printf ("computing svd\n");
*/
        rv1=(float*)mem_alloc(n*sizeof(float));
/* correct pointers */
a--;
v--;
w--;
for (i = 1; i <= m; i++)
a[i]--;
for (i = 1; i <= n; i++)
v[i]--;
rv1--;
        for (i=1;i<=n;i++) {
                l=i+1;
                rv1[i]=scale*g;
                g=s=scale=0.0;
                if (i <= m) {
                        for (k=i;k<=m;k++) scale += fabs(a[k][i]);
                        if (scale) {
                                for (k=i;k<=m;k++) {
                                        a[k][i] /= scale;
                                        s += a[k][i]*a[k][i];
                                }
                                f=a[i][i];
                                g = -SIGN(sqrt(s),f);
                                h=f*g-s;
                                a[i][i]=f-g;
                                if (i != n) {
                                        for (j=l;j<=n;j++) {
                                                for (s=0.0,k=i;k<=m;k++) s += a[k][
                                                f=s/h;
                                                for (k=i;k<=m;k++) a[k][j] += f*a[k
                                        }
                                }
                                for (k=i;k<=m;k++) a[k][i] *= scale;
                        }
                }
                w[i]=scale*g;
                g=s=scale=0.0;
                if (i <= m && i != n) {
                        for (k=l;k<=n;k++) scale += fabs(a[i][k]);
                        if (scale) {
                                for (k=l;k<=n;k++) {
                                        a[i][k] /= scale;
                                        s += a[i][k]*a[i][k];
                                }
                                f=a[i][l];
                                g = -SIGN(sqrt(s),f);
```

```
                h=f*g-s;
                a[i][l]=f-g;
                for (k=l;k<=n;k++) rv1[k]=a[i][k]/h;
                if (i != m) {
                        for (j=l;j<=m;j++) {
                                for (s=0.0,k=l;k<=n;k++) s += a[j][
                                for (k=l;k<=n;k++) a[j][k] += s*rv1
                        }
                }
                for (k=l;k<=n;k++) a[i][k] *= scale;
            }
        }
        anorm=MAX(anorm,(fabs(w[i])+fabs(rv1[i])));
    }
    for (i=n;i>=1;i--) {
        if (i < n) {
            if (g) {
                for (j=l;j<=n;j++)
                        v[j][i]=(a[i][j]/a[i][l])/g;
                for (j=l;j<=n;j++) {
                        for (s=0.0,k=l;k<=n;k++) s += a[i][k]*v[k][
                        for (k=l;k<=n;k++) v[k][j] += s*v[k][i];
                }
            }
            for (j=l;j<=n;j++) v[i][j]=v[j][i]=0.0;
        }
        v[i][i]=1.0;
        g=rv1[i];
        l=i;
    }
    for (i=n;i>=1;i--) {
        l=i+1;
        g=w[i];
        if (i < n)
                for (j=l;j<=n;j++) a[i][j]=0.0;
        if (g) {
            g=1.0/g;
            if (i != n) {
                for (j=l;j<=n;j++) {
                        for (s=0.0,k=l;k<=m;k++) s += a[k][i]*a[k][
                        f=(s/a[i][i])*g;
                        for (k=i;k<=m;k++) a[k][j] += f*a[k][i];
                }
            }
            for (j=i;j<=m;j++) a[j][i] *= g;
        } else {
            for (j=i;j<=m;j++) a[j][i]=0.0;
        }
        ++a[i][i];
    }
    for (k=n;k>=1;k--) {
        for (its=1;its<=30;its++) {
            flag=1;
            for (l=k;l>=1;l--) {
                nm=l-1;
                if (fabs(rv1[l])+anorm == anorm) {
                        flag=0;
                        break;
                }
                if (fabs(w[nm])+anorm == anorm) break;
            }
            if (flag) {
                c=0.0;
                s=1.0;
                for (i=l;i<=k;i++) {
                        f=s*rv1[i];
                        if (fabs(f)+anorm != anorm) {
                                g=w[i];
                                h=PYTHAG(f,g);
                                w[i]=h;
                                h=1.0/h;
                                c=g*h;
                                s=(-f*h);
```

```
                                for (j=1;j<=m;j++) {
                                        y=a[j][nm];
                                        z=a[j][i];
                                        a[j][nm]=y*c+z*s;
                                        a[j][i]=z*c-y*s;
                                }
                        }
                }
                z=w[k];
                if (l == k) {
                        if (z < 0.0) {
                                w[k] = -z;
                                for (j=1;j<=n;j++) v[j][k]=(-v[j][k]);
                        }
                        break;
                }
                if (its == 30)
printf (" sing_val:  no comvergence after 30 iterations!\n");
                x=w[l];
                nm=k-1;
                y=w[nm];
                g=rv1[nm];
                h=rv1[k];
                f=((y-z)*(y+z)+(g-h)*(g+h))/(2.0*h*y);
                g=PYTHAG(f,1.0);
                f=((x-z)*(x+z)+h*((y/(f+SIGN(g,f)))-h))/x;
                c=s=1.0;
                for (j=l;j<=nm;j++) {
                        i=j+1;
                        g=rv1[i];
                        y=w[i];
                        h=s*g;
                        g=c*g;
                        z=PYTHAG(f,h);
                        rv1[j]=z;
                        c=f/z;
                        s=h/z;
                        f=x*c+g*s;
                        g=g*c-x*s;
                        h=y*s;
                        y=y*c;
                        for (jj=1;jj<=n;jj++) {
                                x=v[jj][j];
                                z=v[jj][i];
                                v[jj][j]=x*c+z*s;
                                v[jj][i]=z*c-x*s;
                        }
                        z=PYTHAG(f,h);
                        w[j]=z;
                        if (z) {
                                z=1.0/z;
                                c=f*z;
                                s=h*z;
                        }
                        f=(c*g)+(s*y);
                        x=(c*y)-(s*g);
                        for (jj=1;jj<=m;jj++) {
                                y=a[jj][j];
                                z=a[jj][i];
                                a[jj][j]=y*c+z*s;
                                a[jj][i]=z*c-y*s;
                        }
                }
                rv1[l]=0.0;
                rv1[k]=f;
                w[k]=x;
        }
}
rv1++;
free (rv1);
/*
```

```
printf (" sorting singular values\n");
*/
bubble (m, n, a, w, v);
for (i = 1; i <= m; i++)
a[i]++;
for (i = 1; i <= n; i++)
v[i]++;
w++;
} /* end compute_svd */ void sing_val (m, n, a, sigma, v)
int m, n;
float **a, *sigma, **v;
{
int i, j;

if (n > m)
{
for (i = 0; i < m; i++)
for (j = 0; j < n; j++)
{
v[j][i] = a[i][j];
a[i][j] = 0.0;
} /* end for j */
compute_svd (n, m, v, sigma, a);
} /* end if */
else
compute_svd(m, n, a, sigma, v);
} /* end sing_val */
```

What is claimed is:

1. Apparatus for training a feed forward neural network having at least two layers of nodes, with a first, input layer having n1 nodes and a second, hidden layer having n2 nodes, each node i of said hidden layer having a weight vector $W2_i$, where $i=1,\ldots,n2$, said apparatus comprising:

(a) means for applying to the input layer successive ones of a plurality p of input vectors, for each of which the respective, desired output of the network is known, said input vectors forming an input matrix $$X = X_{i,j},$$

where $i=1,\ldots,p$ and $j=1,\ldots,n1;$ (b) means for determining a set of r orthogonal singular vectors from said input matrix X such that the standard deviations of the projections of said input vectors along these singular vectors, as a set, are substantially maximized, said singular vectors each being denoted by a unit vector $V_1,\ldots,V_{n1}$, where $$V_1^2 + V_2^2 + \ldots + V_{n1}^2 = 1,$$

and having an associated singular value which is a real number greater than or equal to zero, thereby to provide an optimal view of the input data; and (c) means for changing the weight vector $W2_i$ of each hidden layer node to minimize the error of the actual network output with respect to the desired output, while requiring during the training process that each hidden layer weight vector only be allowed to change in a direction parallel to one of the singular vectors of X.

2. Apparatus of claim 1, wherein said neural network has at least three layers of nodes, with a third output layer having n3 nodes, each node of said third output layer having an output weight vector $W3_i$, where $i=1,\ldots,n3$, said apparatus further comprising means for determining the output weight vectors including:

(d) means for independently optimizing the output weight vectors, there being n3 independent optimizations, each of which determines the output weight vector incident on each output node according to the Incremental Least Squares (ILS) procedure.

3. Apparatus of claim 2, further comprising means for producing outputs at each of said first layer nodes which are a sigmoid function of the respective inputs.

4. Apparatus of claim 2, further comprising means for producing outputs at each of said second layer nodes which are a sigmoid function of the respective inputs.

5. Apparatus of claim 1, further comprising means for producing outputs at each of said first layer nodes which are a sigmoid function of the respective inputs.

6. Apparatus of claim 1, further comprising means for producing outputs at each of said second layer nodes which are a sigmoid function of the respective inputs.

7. Apparatus for training a neural network composed of nodes having differentiable one-to-one nonlinear transfer functions such that, a plurality p of input vectors may be identified for each of which the respective, desired output vector of the network is known, said input vectors being represented as an input matrix $$X = X_{i,j},$$

where $i=1,\ldots,p$, $j=1,\ldots,n$, n being the dimensionality of the input vectors, and said output vectors being represented as an output matrix $$Y = Y_{i,j},$$

where $i=1,\ldots,p$, $j=1,\ldots,m$, m being the dimensionality of the output vectors; all nodes in the network to which input vectors are presented being identified as input nodes denoted as $$I_1, \ldots, I_n$$

where n is the dimensionality of the input vectors; all nodes in the network from which output vectors are to be extracted being identified as output nodes denoted as $$\omega_1, \ldots, \omega_m$$

where m is the dimensionality of the output vectors; and the remaining nodes in the network being identified as hidden nodes denoted as $$\epsilon_1, \ldots, \epsilon_{t-(n+m)}$$

where t is the total number of nodes comprising the neural network; said apparatus comprising:
  (a) means for associating with each hidden node $\epsilon_i$ a weight vector $u_i$ representing the strength of all synaptic connections leading to said hidden node $\epsilon_i$, where $i=1,\ldots,t-(n+m)$, and associating with every output node $\omega_i$, a weight vector $v_i$ representing the strengths of all synaptic connections leading to said output node $\omega_i$, where $i=1,\ldots,m$; each hidden node $\epsilon_i$ having identified therewith a set of optimal direction vectors denoted as $d_{i,j}$ where $i=1,\ldots,t-(n+m), j=1,\ldots,r_i$, $r_i$ being the dimensionality of the weight vector $u_i$ associated with said hidden node $\epsilon_i$ and moreover being the number of nodes from which said hidden node $\epsilon_i$ receives inputs as well as being equal to the dimensionality of said direction vectors $d_{i,j}$, the concept of optimality of said vector $d_{i,j}$ being defined in terms of an orthogonal direction along which the standard deviation of the projections of the inputs are essentially maximized, and said vectors $d_{i,j}$, being obtained as singular vectors of the input space for the hidden node $\epsilon_i$;
  (b) means for imposing a constraint on each weight vector $u_i$ which requires said weight vector to be aligned with a particular direction vector $d_{i,j(i)}$, and sized by a variable scalar multiplier $c_i$, said constraint being expressed by the equation $$u_i = c_i d_{i,j(i)},$$

where $i=1,\ldots,t-(n+m)$ and the index j(i) is selected by processes which operate by choosing a direction vector $d_{i,j(i)}$ along which changes in the weight vector $u_i$ tend to most quickly decrease the deviations between the actual output vectors of the network measured at the output nodes $\omega_k$ where $k=1,\ldots,m$, and the desired output vectors as represented by said output matrix Y, said deviation being measured by processes exemplified by but not limited to the root means square measure of error, said root means square error being defined by the equation $$e = \left( \sum_{i=1}^{p} \sum_{j=1}^{m} (a_{i,j} - y_{i,j})^2 \right)^{1/2},$$

where $a_{i,j}$ is the result of the propagation of input vector i applied to all input nodes simultaneously and the result propagated throughout the network to each output node $\omega_j$, where $i=1,\ldots,p, j=1,\ldots,m$;
  (c) means for performing the Iterative Least Squares solution for the weight vector $v_i$ identified with each output node $\omega_i$, where $i=1,\ldots,m$;
  (d) means for performing a numerical optimization of the scalar multipliers $c_i$ which determine the weights identified with each hidden node $\epsilon_1$, where $i=1,\ldots,t-(n+m)$, said optimization being performed in such a manner as to adjust the totality of all said multipliers $c_i$ so as to reduce deviation between the output values generated by propagating all inputs through the network to the final output nodes denoted $\omega_j$, $j=1,\ldots,m$ and the desired output values $Y_{k,j}$, $k=1,\ldots,p, j=1,\ldots,m$;
  (e) means for evaluating the selection of the index j(i) associated with the direction vector $d_{i,j(i)}$ at each hidden node $\epsilon_i$, where $i=1,\ldots,t-(n+m)$, so that said index may be replaced by a choice consistent with the conditions set forth in step (b) as effected by evolution of the network through the training process;
  (f) means for reconstructing the entire set of direction vectors $d_{i,j}$ associated with hidden node $\epsilon_i$;
  (g) means for performing a repetition of steps (a), ..., (f) in such a manner as to effectively minimize deviations between the actual output vectors of the network and the desired output vectors, said deviations being dependent upon a specific implementation, but exemplified by the root mean squares measure of error.

8. Apparatus defined in claim 7 as applied to a layered neural network, the nodes of which are divided into some number K of separate classes, said node classes defining layers of said network, there being connections only between nodes in distinct layers; and wherein the totality of connections between any two layers $L_i$ and $L_j$ are completely characterized by a matrix $$H_{(i,j)} = H_{\alpha,\beta(i,j)},$$

where $1 <= i < j <= K, \alpha=1,\ldots,n_j, \beta=1,\ldots,n_i$ and $n_i$, $n_j$ are the respective numbers of nodes comprising layer i and layer j.

9. Apparatus defined in claim 7 as comprising a feed-forward neural network, said feed-forward network being characterized by the capability to propagate an input through the network in only the forward direction so that inputs to each node are dependent on only those nodes seen to precede said node in the order of propagation of data through the network, the graphical realization of said feed-forward network being a directed graph with directed edges or arcs in place of the data flow connections of the network, and with the direction of said arcs being that of forward propagation of data through said data flow connections of the neural network, and further, with said directed graph being free of loops or cycles of any kind.

10. Apparatus defined in claim 7 comprising a 3-layer feed-forward neural network, every hidden node $\epsilon_i$ of said 3-layer feed-forward network receiving inputs exclusively from input nodes $I_j$, where $i=1,\ldots,t-(n+m), j=1,\ldots,n$, said input nodes having values obtained directly from said input matrix X, the input space for said hidden node $\epsilon_i$ being completely spanned, generated and defined by the vectors commonly referenced as the row vector of said input matrix X, thereby rendering said input space, as well as all singular vectors and singular values thereof, invariant and constant with respect to all evolution arising from training;

wherein the weights on all connections between the input nodes and hidden nodes are identified as the matrix $$U = u_{i,j}$$

where $i=1,\ldots,t-(n+m)$, $j=1,\ldots,n$;
the weights on all connections leading to output nodes are identified as the matrix $$W = w_{i,j}$$

where $i=1,\ldots,m$, $j=1,\ldots,r$, the value r being sufficient to support such connections as are required for the implementation, in particular, if direct connections from input to output are to be realized, $r=t-m$; and the inputs to all output nodes are identified as the matrix $$Z = z_{i,j}$$

where $i=1,\ldots,p$, $j=1,\ldots,r$; said apparatus further comprising:

(h) means for obtaining for each hidden node $\epsilon_i$ the optimal set of directions $d_{i,j}$ by extracting the singular vectors from the input space of the node, said singular vectors being substantially equivalent to the singular vectors of the input matrix X; and (i) means for using the Iterative Least Squares (ILS) method to obtain an optimal set of output weights.

* * * * *